United States Patent
Lu et al.

(10) Patent No.: US 11,963,171 B2
(45) Date of Patent: Apr. 16, 2024

(54) METHOD AND APPARATUS FOR CONFIGURATION AND SCHEDULING OF SIDELINK RESOURCES

(71) Applicant: ZTE CORPORATION, Guangdong (CN)

(72) Inventors: Youxiong Lu, Guangdong (CN); Weimin Xing, Guangdong (CN); Jin Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 472 days.

(21) Appl. No.: 17/212,553

(22) Filed: Mar. 25, 2021

(65) Prior Publication Data
US 2021/0212050 A1    Jul. 8, 2021

Related U.S. Application Data

(63) Continuation of application No. PCT/CN2018/108456, filed on Sep. 28, 2018.

(51) Int. Cl.
*H04L 5/00* (2006.01)
*H04W 72/04* (2023.01)
*H04W 72/20* (2023.01)

(52) U.S. Cl.
CPC .......... *H04W 72/20* (2023.01); *H04L 5/0005* (2013.01); *H04L 5/0048* (2013.01)

(58) Field of Classification Search
CPC ....... H04W 72/20; H04L 5/005; H04L 5/0048
See application file for complete search history.

(56) References Cited

U.S. PATENT DOCUMENTS

| 11,412,494 | B2 * | 8/2022 | Shen | H04L 1/0039 |
| 11,716,724 | B2 * | 8/2023 | Baldemair | H04W 72/232 |
| | | | | 370/329 |
| 2015/0223213 | A1 * | 8/2015 | Moon | H04W 52/325 |
| | | | | 370/329 |

(Continued)

FOREIGN PATENT DOCUMENTS

| CN | 106797635 A | 5/2017 |
| CN | 107534828 A | 1/2018 |

(Continued)

OTHER PUBLICATIONS

3GPP TSG-RAN WG4 Meeting #57, R4-104032 (Year: 2010).*

(Continued)

*Primary Examiner* — Christopher M Crutchfield
*Assistant Examiner* — Abusayeed M Haque
(74) *Attorney, Agent, or Firm* — Duane Morris LLP

(57) ABSTRACT

A method and apparatus for configuration and scheduling of sidelink resources for sidelink communications in a wireless communication network is disclosed. In one embodiment, a method performed by a first wireless communication device, includes: determining a sidelink resource unit in a sidelink resource set according to a resource aggregation level, wherein the sidelink resource unit in the sidelink resource set comprises a first number of first resource units in the time domain and a second number of second resource units in the frequency domain, and wherein the first number of the first resource units in the time domain is determined according to the resource aggregation level.

16 Claims, 10 Drawing Sheets

(56) References Cited

U.S. PATENT DOCUMENTS

| | | | |
|---|---|---|---|
| 2016/0143038 A1 | 5/2016 | Goto | |
| 2017/0230154 A1* | 8/2017 | Tavildar | H04W 72/121 |
| 2017/0295601 A1 | 10/2017 | Kim et al. | |
| 2017/0366328 A1 | 12/2017 | Seo | |
| 2018/0092097 A1 | 3/2018 | Yokoyama | |
| 2018/0146439 A1 | 5/2018 | Kim | |
| 2018/0279304 A1* | 9/2018 | Lee | H04W 72/23 |
| 2019/0020506 A1* | 1/2019 | Cheng | H04L 1/007 |
| 2019/0068333 A1* | 2/2019 | Luo | H04L 1/1822 |
| 2021/0127369 A1* | 4/2021 | Ma | H04L 5/0048 |

FOREIGN PATENT DOCUMENTS

| | | |
|---|---|---|
| CN | 112753186 A | 5/2021 |
| EP | 3352405 A1 | 7/2018 |
| JP | 2016149583 A | 8/2016 |
| JP | 2018050261 A | 3/2018 |
| JP | 2018506902 A | 3/2018 |
| WO | 2016117940 A1 | 7/2016 |
| WO | 2016181240 A1 | 11/2016 |
| WO | WO-2018016135 A1 * | 1/2018 ........... H04B 7/0452 |
| WO | 2018094872 A1 | 5/2018 |
| WO | 2018174761 A1 | 9/2018 |
| WO | 2020033719 A1 | 2/2020 |

OTHER PUBLICATIONS

3GPP TGS-RAN2 Meeting 89 bits, R2-151188 (Year: 2015).*

3GPP TSG-RAN WG2 Meeting#89 bits, R2-151071 Title: protocol architecture for WLAN-LTE aggregation (Year: 2015).*

LG Electronics, "On the Resource Pool Configuration for D2D Communications" 3GPP TSG RAN WG1 Meeting #76, RI-140332, Prague, Czech Republic, Feb. 10-14, 2014, Feb. 1, 2014, 13 pages.

NEC, "TB mapping across aggregated slots," 3GPP TSG RAN WG1 Meeting #90, R1-1712996, Prague, Czech Republic, Aug. 11, 2017, 3 pages.

* cited by examiner

METHOD AND APPARATUS FOR CONFIGURATION AND SCHEDULING OF SIDELINK RESOURCES

TECHNICAL FIELD

This disclosure relates generally to wireless communications and, more particularly, to a method and apparatus for configuration and scheduling of sidelink resources for sidelink communications in a wireless communication network.

BACKGROUND

Sidelink (SL) communication is a wireless radio communication directly between two or more user equipment devices (hereinafter "UE"). In this type of communication, two or more UEs that are geographically proximate to each other can directly communicate without going through a base state (BS), e.g., an eNB in an long-term evolution (LTE) system or a gNB in New Radio, or a core network. Data transmission in sidelink communications is thus different from typical cellular network communications, in which a UE transmits data to a BS (i.e., uplink transmissions) or receives data from a BS (i.e., downlink transmissions). In sidelink communications, data is transmitted directly from a source UE to a target UE through the Unified Air Interface, e.g., PC5 interface. Sidelink communications can provide several advantages, for example reducing data transmission load on a core network, system resource consumption, transmission power consumption, and network operation costs, saving wireless spectrum resources, and increasing spectrum efficiency of a cellular wireless communication system.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In the 5G wireless communication system, a resource granularity with a finer and more flexible configuration in the time and frequency domain are utilized. Accordingly, a flexible resource scheduling indication method is developed. Based on the flexible resource granularity, a definition and management of corresponding sidelink channel resources are proposed for sidelink communications. Further, current sidelink channel resource schemes cannot be directly applied to such flexible resource configuration and scheduling method in the 5G wireless communication system. Therefore, a method and apparatus for configuration of sidelink channel resource units in the present disclosure can achieve effective utilization of resources, improve resource allocation flexibility, reduce signaling overhead, and processing complexity, etc. As used herein, a "sidelink channel resource unit" refers to a resource set in the time and frequency domain on which sidelink communications can be performed on a respective sidelink channel.

In one embodiment, a method performed by a first wireless communication device, includes: determining a sidelink resource unit in a sidelink resource set according to a resource aggregation level, wherein the sidelink resource unit in the sidelink resource set comprises a first number of first resource units in the time domain and a second number of second resource units in the frequency domain, and wherein the first number of the first resource units in the time domain is determined according to the resource aggregation level.

In another embodiment, a method performed by a wireless communication node, includes: transmitting configuration information of a sidelink resource unit in a sidelink resource set to a first wireless communication device, wherein the configuration information of the sidelink resource unit comprises a resource aggregation level, wherein the configuration information is used by the first wireless communication device to determine the sidelink resource unit for sidelink communications, wherein the sidelink resource unit in the sidelink resource set comprises a first number of first resource units in the time domain and a second number of second resource units in the frequency domain, and wherein the first number of the first resource units in the time domain is determined according to the resource aggregation level.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
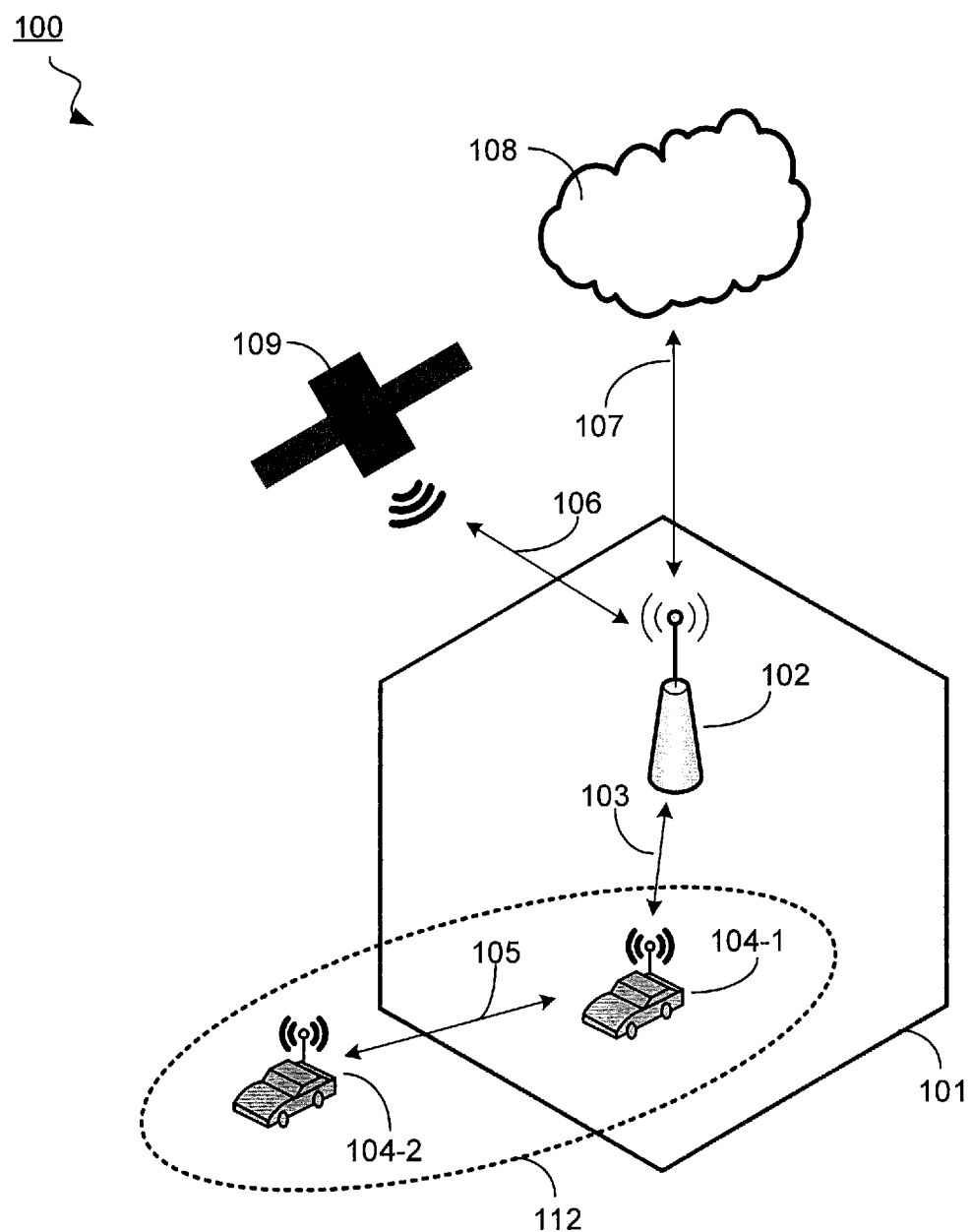
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network-side wireless communication node can be a node B, an E-utran Node B (also known as Evolved Node B, eNodeB or eNB), a gNodeB (also known as gNB) in new radio (NR) technology, a pico station, a femto station, or the like. In some embodiments, a network-side wireless communication node can also comprises a Relay Node (RN), a multicell coordination entity (MCE), a gateway (GW), a sidelink management/control node, a mobility management entity (MME), a EUTRAN Operation/Administration/Maintenance (OAM) device. A terminal-side wireless communication device can be a long range communication system like a mobile phone, a smart phone, a personal digital assistant (PDA), tablet, laptop computer, or a short range communication system such as, for example a wearable device, a vehicle with a vehicular communication system and the like. A network-side wireless communication node is represented by a base station (BS) 102 hereinafter in all embodiments, and is generally referred to as "wireless communication node". A terminal-side communication device is represented by a user equipment (UE) 104 hereinafter in all embodiments, and is generally referred to as "wireless communication devices". Such communication nodes and devices may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a BS 102A, a first UE 104-1, and a second UE 104-2. The first UE 104-1 is a vehicle that is moving in a first cell 101 covered by the BS 102. In some embodiments, the UE 104-1 has direct communication channels 103 with the BS 102. The second UE 104-2 can be also a vehicle that is moving outside of the coverage of the cell 101 covered by the BS 102, and does not have a direct communication channel with the BS 102A. Although the UE 104-2 does not have a direct communication channel with the BS 102, it may form a direct communication channel with a different BS 102 (not shown) and it can also form a direct communication channel 105 with its neighbor UEs, e.g., UE 104-1 within a sidelink (SL) communication group 112. The direct communication channels between the UE 104 and the BS 102 can be through interfaces such as an Uu interface, which is also known as UMTS (Universal Mobile Telecommunication System (UMTS) air interface. The direct communication channels 105 between the UEs 104 can be through a PC5 interface, which is introduced to address high moving speed and high density applications such as Vehicle-to-everything (V2X) and Vehicle-to-Vehicle (V2V) communications. The BS 102 is connected to a core network (CN) 108 through an external interface 107, e.g., an Iu interface, a NG interface, and a S1 interface according to types of the BS 102.

The first UE 104-1 obtains its synchronization reference. The BS 102 obtains its own synchronization reference from the CN 108 through an internet time service, such as a common time NTP (Network Time Protocol) server or a RNC (Radio Frequency Simulation System Network Controller) server. This is known as network-based synchronization. Alternatively, the BS 102 can also obtain synchronization reference from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102 decode these signals, effectively synchronizing the corresponding BS 102 to the atomic clocks. This enables corresponding BS 102 to determine the time within 100 billionths of a second (i.e., 100 nanoseconds), without the cost of owning and operating atomic clocks. The first UE 104-1 can also directly obtain resources in the time and frequency domain for receiving and/or transmitting sidelink signals from the BS 102.

Similarly, the second UE 104-2 can obtain a synchronization reference and resources in the time and frequency domain for sidelink communications from the corresponding BS 102 (not shown) which further obtains its own synchronization reference from the CN 108 or from a GNSS 109, as discussed in detail above. The second UE 104-2 can also obtain a synchronization reference through the first UE 104-1 in sidelink communications, wherein the synchronization reference of the first UE 104-1 can be either network-based or satellite-based, as described above. Similarly, the second UE 104-2 can also directly obtain resources in the time and frequency domain for receiving and/or transmitting sidelink signals from the BS 102.

Figure 1B:
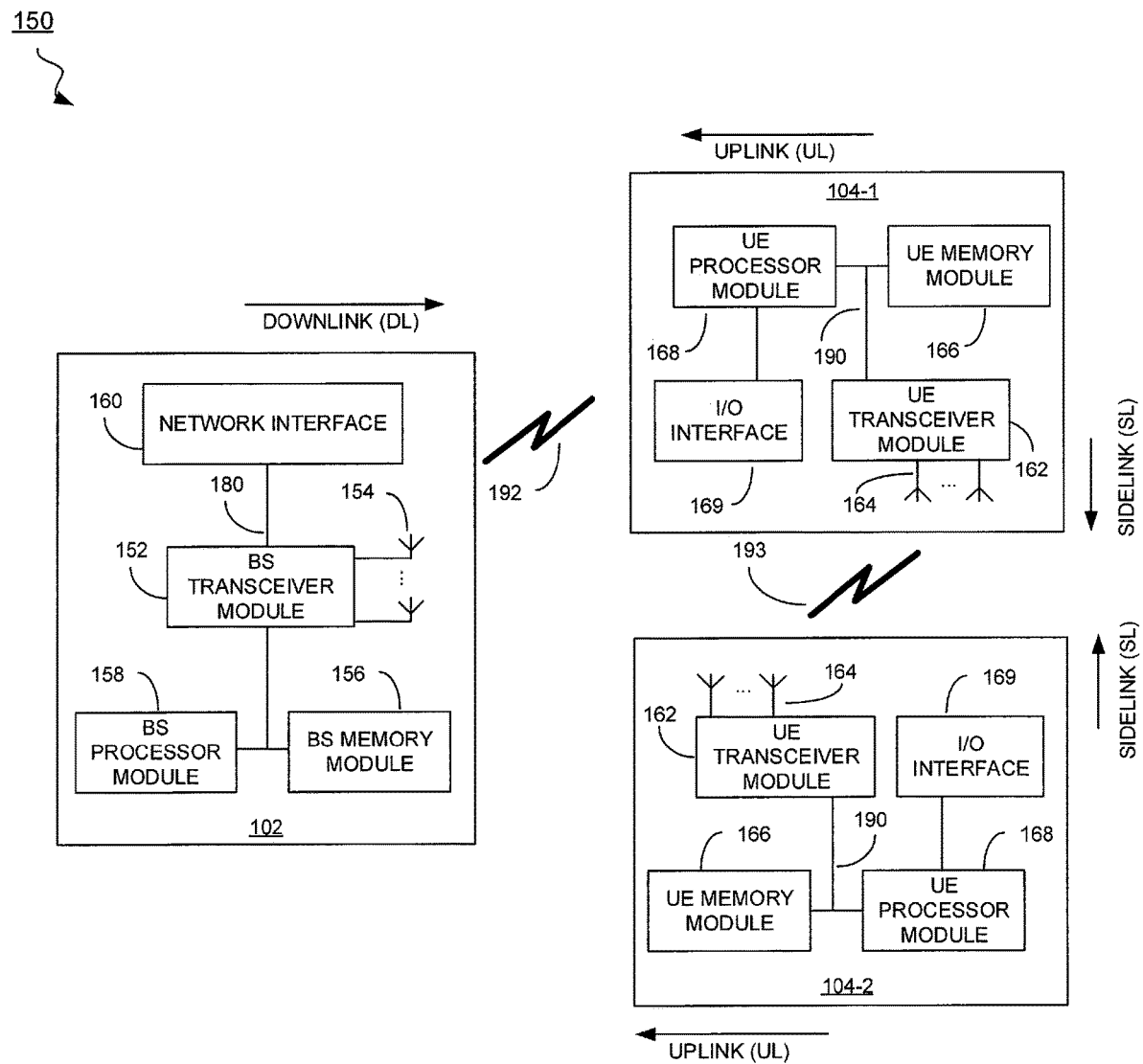
FIG. 1B illustrates a block diagram of an exemplary wireless communication system for a slot structure information indication, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102, a first UE 104-1 and a second UE 104-2, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively.

Memory modules 156 and 166 may also each include non-volatile memory for storing instructions to be executed by the processor modules 158 and 168, respectively.

The network interface 160 generally represents the hardware, software, firmware, processing logic, and/or other components of the BS 102 that enable bi-directional communication between BS transceiver 152 and other network components and communication nodes configured to communication with the BS 102. For example, the network interface 160 may be configured to support internet or WiMAX traffic. In a typical deployment, without limitation, the network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE 104 communicates with the BS 102, and with other UEs, e.g., between the UE 104-1 and 104-2. As described in further detail below, the UE 104 supports sidelink communications with other UE's as well as downlink/uplink communications between the BS 102 and the UE 104. As discussed above, sidelink communication allows the UEs 104-1 and 104-2 within a sidelink communication group 112 to establish a direct communication link with each other, or with other UEs from different cells, without requiring the BS 102 to relay data between UE's.

Figure 2:
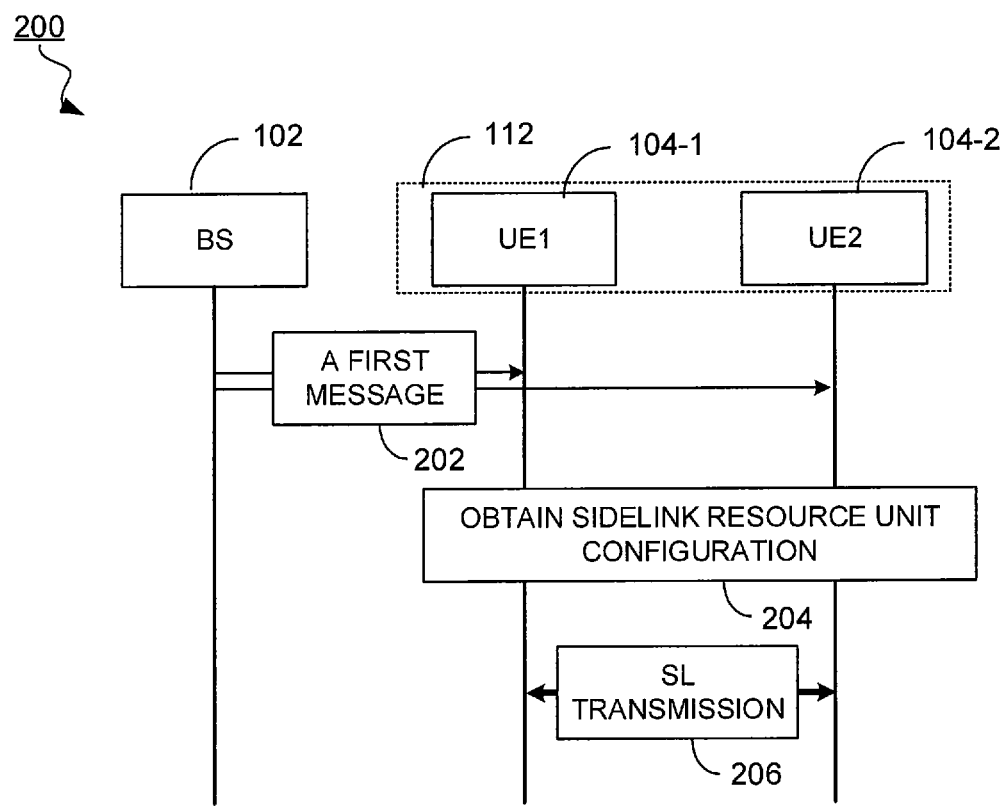
FIG. 2 illustrates a method for configuring sidelink resource units for sidelink communications, in accordance with some embodiments of the present disclosure.

FIG. 2 illustrates a method 200 for configuring sidelink resource units for sidelink communications, in accordance with some embodiments of the present disclosure. It is understood that additional operations may be provided before, during, and after the method 200 of FIG. 2, and that some operations may be omitted or reordered. The communication system in the illustrated embodiment comprises a BS 102, a first UE 104-1 and a second UE 104-2. In the illustrated embodiments, the first UE 104-1 is in one of at least one serving cell covered by the BS 102, i.e., the first UE 104-1 is in directly connection with the BS 102; and the second UE 104-2 is not in any of the serving cell covered by the BS 102 and cannot directly communicate with the BS 102. In the illustrated embodiment, the first UE 104-1 and the second UE 104-2 are in a sidelink communication group 112. It should be noted that the method 200 presented in FIG. 2 is for illustration purposes and not intended to be limiting. The communication system may contain any numbers of BS 102 and UE 104 can be used and are within the scope of this invention.

The method 200 starts with operation 202 in which the BS 102 transmits a first message to the first UE 104-1 and the second UE 104-2 according to some embodiments. In some embodiments, the first message comprises a configuration and/or an indication of a resource aggregation level of a sidelink resource unit for sidelink communications, wherein the resource aggregation level of a sidelink resource unit is a number of first resource units in the time domain in a sidelink resource unit used in a sidelink transmission by a UE 104. In some embodiments, a sidelink resource unit comprise at least one first resource unit in the time domain and at least one second resource unit in the frequency domain. In some embodiments, the at least one first resource unit each is one of the following: a symbol and a time slot. The at least one second resource unit each comprises one of the following: a subcarrier, a carrier, and a resource block (RB). In some embodiments, the numerology of the first resource units in the time domain in a sidelink resource unit is a numerology of one of the following: a bandwidth part (BWP) for sidelink communication, a configuration of a sidelink resource pool, a sidelink resource set, and a reference numerology.

In some embodiments, when the first resource unit is a time slot, a sidelink resource unit may comprise a plurality of time slots in the time domain which can be used in a sidelink transmission. Further, the plurality of time slots in the sidelink resource unit each comprises at least one symbol which is used in the sidelink transmission. In some embodiments, the plurality of time slots is one of the following: a plurality of physical time slots and a plurality of logical time slots. In some embodiments, the plurality of logical time slots for sidelink communications comprises a plurality of physical time slots in the time domain which are for sidelink communications. A radio frame comprises a plurality of physical time slots (i.e., $s_i$) in the time domain, wherein i is a non-negative integer. For example, when i=1, 2, 4, 6, physical time slots, $s_1$, $s_2$, $s_4$ and $s_6$ are for sidelink communications. These 4 physical time slots can be grouped together to form a continuous logical time slot set, which comprises 4 logical time slots, $s_0$, $s_1$, $s_2$ and $s_3$ corresponding to $s_1$, $s_2$, $s_4$ and $s_6$ in the physical time slots. The first resource unit in the time domain in a sidelink resource unit which is a time slot is used for purpose of discussions hereinafter and is not intended to be limiting.

In some embodiments, the first message can be one of the following: a system message, a system-specific message, and a pre-configuration message. In some embodiments, the configuration of a resource aggregation level is transmitted using a RRC message. In some other embodiments, the indication of a resource aggregation level is transmitted in one of the following: a downlink control information (DCI) message, a sidelink control information (SCI) message and a preconfiguration of the resource aggregation level.

In some embodiments, a resource aggregation level (P) can be indicated using one of the following: an index value (I), a parameter (N), and an absolute value (C), wherein C is an integer or a fraction, N is an integer. For example $C=2^N$, wherein N=−2, −1, 0, 1, and 2. In some embodiments, an index value of the aggregation level has a one-to-one or one-to-multiple mapping relationship with the parameter (N) and the absolute value (C). In some embodiments, a mapping relationship can be preconfigured by the system or indicated by a system message. In some embodiments, when a parameter N is determined at a given index I, the absolute value C is determined according to a given equation, e.g., $C=2^N$.

In some embodiments, the first message can be also transmitted from a specific UE to other UEs. For example, the specific UE can be one of the following: a roadside unit (RSU), a leading UE 104 in a vehicular communication group, a UE 104 in a sidelink group specified by the BS 104 for scheduling and configuring sidelink resources to the UEs in the sidelink communication group 112.

Figure 3:
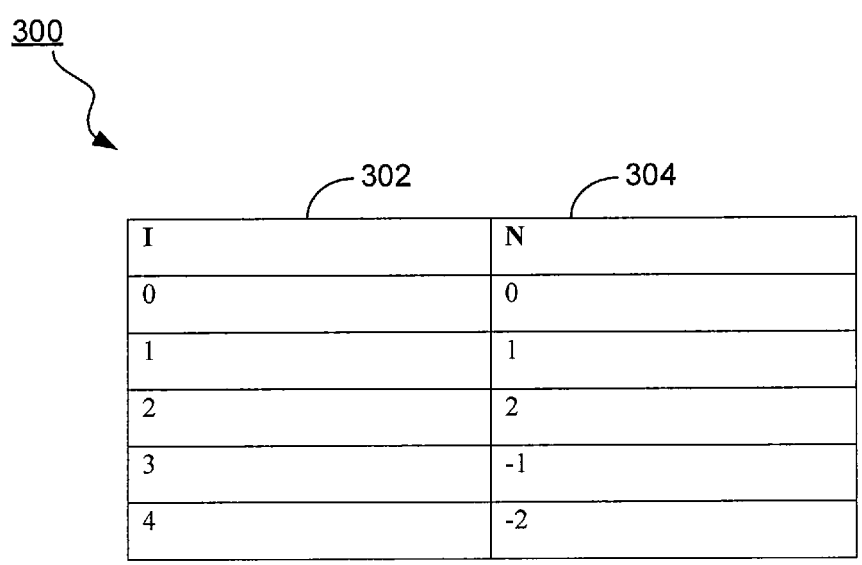
FIG. 3 illustrates a table showing a mapping relationship between a parameter (N) and an index (I) of a resource aggregation level, in accordance with some embodiments of the present disclosure.

FIG. 3 illustrates a table 300 showing a mapping relationship between a parameter (N) and an index (I) of a resource aggregation level, in accordance with some embodiments of the present disclosure. In the illustrated embodiment, the table 300 comprises 5 parameter values and 5 corresponding indices. Although only 5 aggregation levels are shown in table 300, it should be noted any numbers of aggregation level values with any values can be included which are within the scope of this invention.

In the illustrated embodiment, at a resource aggregation level index I of 0, N=0; at a resource aggregation level index I of 1, N=1; at a resource aggregation level index I of 2, N=2; at a resource aggregation level index I of 3, N=−1; and at a resource aggregation level index I of 4, N=−2. In some embodiments, a corresponding absolute value (C) of the resource aggregation level can be further determined according to a pre-defined relationship, e.g., $C=2^N$.

Figure 4:
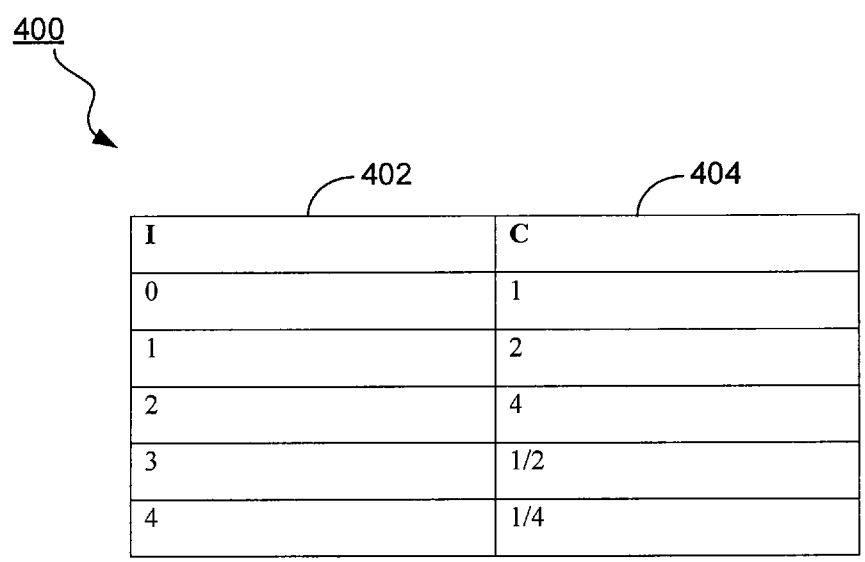
FIG. 4 illustrates a table showing a mapping relationship between an absolute value (C) and an index (I) of a resource aggregation level, in accordance with some embodiments of the present disclosure.

FIG. 4 illustrates a table 400 showing a mapping relationship between an absolute value (C) and an index (I) of a resource aggregation level, in accordance with some embodiments of the present disclosure. In the illustrated embodiment, the table 400 comprises 5 absolute values of a resource aggregation levels and 5 corresponding indices. Although only 5 aggregation levels are shown in table 400, it should be noted any numbers of aggregation level values with any values can be included which are within the scope of this invention. In the illustrated embodiment, at a resource aggregation level index I of 0, C=1 which indicates no resource aggregation and a sidelink resource unit comprising a time slot; at a resource aggregation level index I of 1, C=2 which indicates a sidelink resource unit comprising 2 time slots; at a resource aggregation level index I of 2, C=4 which indicates a sidelink resource unit comprising 4 time slot; at a resource aggregation level index I of 3, C=½ which indicates that symbols in a time slot for sidelink communication is divided into 2 parts, wherein the 2 parts each comprises at least one symbol and a sidelink resource unit occupies one of the 2 parts in a time slot. In some embodiments, the number of parts in a time slot and the number of symbols in each of the parts of a time slot are preconfigured by the system or configured by the BS 102. In some embodiments, the position of the part in a time slot for a sidelink resource unit can be indicated by a parameter, e.g., slot_start, which is discussed in detail below. In some embodiment, the parameter indicates a starting position of the first symbol a sidelink resource unit of a time slot for sidelink communication. For example, a time slot comprising 14 symbols for sidelink communication can be divided into 2 symbol parts, wherein the 2 symbol parts each comprises 7 symbols. For another example, a time slot comprising 10 symbols for sidelink communication can be divided into 2 symbol parts, wherein a first symbol part comprises 4 symbols and a second symbol part comprises 6 symbols. When a C value of ½ is indicated, one of the 2 symbol parts in a time slot is used as a sidelink resource unit. Similarly, at a resource aggregation level index I of 4, C=¼ indicates one of 4 symbol parts in a time slot is used as a sidelink resource unit. For example, a time slot comprising 13 symbols for sidelink communications can be divided into 4 symbol parts, e.g., a first symbol part comprises 2 symbols, a second symbol part comprises 4 symbols, a third symbol part comprises 2 symbols and a fourth symbol part comprises 5 symbols. In some embodiments, a number of symbol parts in a time slot and a number of symbols in each of the symbol parts of a time slot is preconfigured in a configuration table. It should be noted this configuration of symbol parts in a time slot is just an example and is not intended to be limiting. A time slot with any number of symbols for sidelink communication can comprises any number of symbol parts and each symbol parts can comprises any number of symbols, which are within the scope of this invention.

In some embodiments, the first message further comprises a starting position of the scheduled sidelink resources in the time domain. For example, the starting position of the sidelink resource unit is a time slot number. In some embodiments, the position of the sidelink resource unit also comprises the type of time slot, wherein the type of time slot comprises one of the following: a physical time slot and a logical time slot. In some embodiments, the type of time slot is predefined or preconfigured by the system.

The method 200 continues with operation 204 in which the first UE 104-1 and the second UE 104-2 determine the configuration of a sidelink resource unit for sidelink communications according to some embodiments. In some embodiments, the configuration of a sidelink resource unit for sidelink communication can be determined according to the resource aggregation level and a starting position of the sidelink resource unit. In some embodiments, the configuration of a sidelink resource unit comprises a number and a position of first resource units (e.g., time slots) in the time domain in a sidelink resource unit in a sidelink resource set, which is of one of the following: a sidelink resource pool, a carrier, and a BWP for sidelink communication. For example, when an aggregation level P has an index of 1 and a C value of 2, a sidelink resource unit, i.e., a TTI (transmission time interval) resource comprises 2 time slots for a sidelink transmission. In some embodiments, the 2 time slots can be two adjacent physical time slots or logical time slots or two adjacent time slots in a sidelink resource pool. In some embodiments, the 2 time slots can be used as scheduled resources for physical sidelink shared channel/physical sidelink control channel (PSSCH/PSCCH). The 2 time slots each comprises at least one symbol for sidelink communications.

In some embodiments, a starting position in the time domain of the sidelink resource unit can be configured by a higher layer signaling, wherein the starting position in the time domain of the sidelink resource unit (i.e., slot_start) is a position of one of the following: the first symbol, the first symbol part, and the first time slot of the sidelink resource unit in the time domain. When slot_start=k wherein k is a non-negative integer, then the sidelink resource unit starts at time slot k and every C (i.e., C=2) time slots are used as a sidelink resource unit for a respective sidelink transmission. When slot_start is not defined, the slot_start equals 0 by default.

Figure 5:
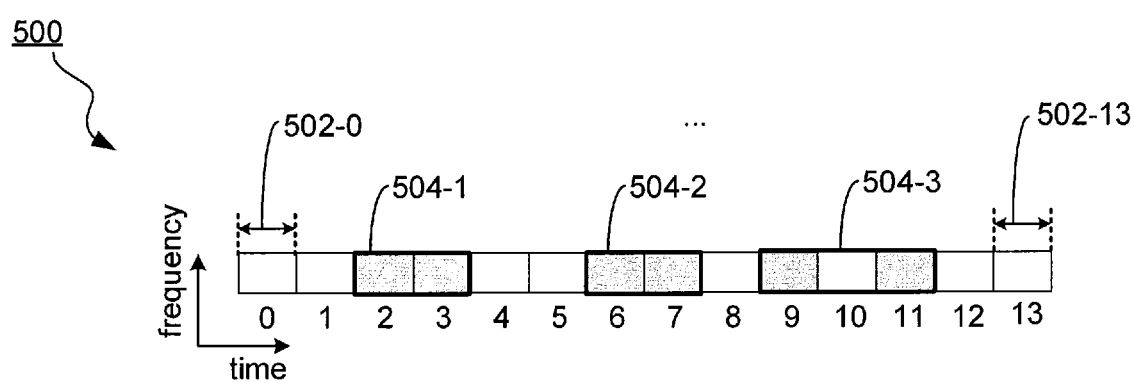
FIG. 5 illustrates a schematics of a radio frame structure with a plurality of sidelink resource unit, in accordance with some embodiments of the present disclosure.

FIG. 5 illustrates a schematics of a radio frame structure 500 with a plurality of sidelink resource unit 504, in accordance with some embodiments of the present disclosure. It should be noted FIG. 5 is for illustration purposes and is not intended to be limiting. A radio frame structure 500 may comprise any numbers of sidelink resource unit 504 at any positions and the sidelink resource unit 504 further comprises any numbers of physical or logical time slots and the time slots may further comprise any numbers of symbols in the time domain at any positions for sidelink communications, which are within the scope of this invention.

In the illustrated embodiment, the radio frame structure 500 comprises 14 physical time slots 502, in which 6 time slots 502 are for sidelink communications. Specifically, time slots 502-2, 502-3, 502-6, 502-7, 502-9, and 502-11 are time slots for sidelink communications. When a slot_start of 2 and a resource aggregation level P with an absolute value C of 2 are indicated, a first sidelink resource unit 504-1 comprises two continuous time slots 502-2 and 502-3, a second sidelink resource unit 504-2 comprises two continuous time slots 502-6 and 502-7, and a third sidelink resource unit 504-3 comprises 3 continuous time slots 502-9, 502-10 and 502-11, in which time slots 502-9 and 502-11 are for sidelink communications. In some embodiments, the 6 time slots for sidelink communications each comprises at least one symbol for sidelink communication, wherein the at least one symbol is preconfigured by the system or configured by the BS 102. In some embodiments, the starting position of the second sidelink resource unit 504-2 is the position of the third time slot in the time domain for sidelink communications. For example, when the third time slot for sidelink communication is time slot 502-6, the second sidelink resource unit 504-2 comprises time slots 504-6 and 504-7. For another example, when the fifth time slot for sidelink communication is time slot 502-9, the third sidelink resource unit 504-3 comprises 2 time slots 504-9 and 504-11 for sidelink communications and 1 time slot 504-10 for non-sidelink communications. In some embodiments, a constant interval between two adjacent sidelink resource units can be preconfigured to determine the starting position of the second sidelink resource unit 504-2 and the third sidelink resource unit 504-3. In some other embodiments, the starting position of the second sidelink resource unit 504-2 and the third sidelink resource unit 504-3 can be individually indicated by the DCI or SCI message.

In some embodiments, the starting position of the first sidelink resource unit 504-1 is indicated by a corresponding DCI and the second sidelink resource unit 504-2 can be indicated by a corresponding SCI. For example, when the SCI is transmitted on time slot 502-6, the second sidelink resource unit 504-2 comprises time slot 502-6 and 502-7, wherein the second sidelink resource unit 504-2 is a PSSCH resource.

For another example, when an aggregation level P with an index of 3 which corresponds to a N value of −1 and a C value of ½ is indicated in a sidelink control information (SCI) message, a time slot comprises 2 symbol parts and a sidelink resource unit (i.e., a TTI resource) one of the two symbol parts for a sidelink transmission. In some embodiments, the time slot can be a physical time slot or a logical time slot or a sidelink resource pool as scheduled resources for sidelink channels, for example physical sidelink shared channel/physical sidelink control channel (PSSCH/PSCCH). The sidelink resource unit in a symbol part comprises at least one symbol for sidelink communications. In some embodiments, a starting position in the time domain of the sidelink resource unit can be one of the following: preconfigured by the system, and indicated by a downlink control information (DCI) or a SCI, wherein the starting position in the time domain of the sidelink resource unit (i.e., slot_start) is a position of the first time slot or the first symbol in the sidelink resource unit in the time domain. In some embodiments, a receiving position of a DCI is n time slot, a starting position of the sidelink resource unit can be determined according to the receiving position of a DCI, e.g., n+slot_start+offset, wherein an offset is a time offset value between #n slot and its indicated resource slot. In some embodiments, the offset value is preconfigured or configured. In some embodiments, the offset value can be a non-negative integer or a non-negative fraction.

Figure 6:
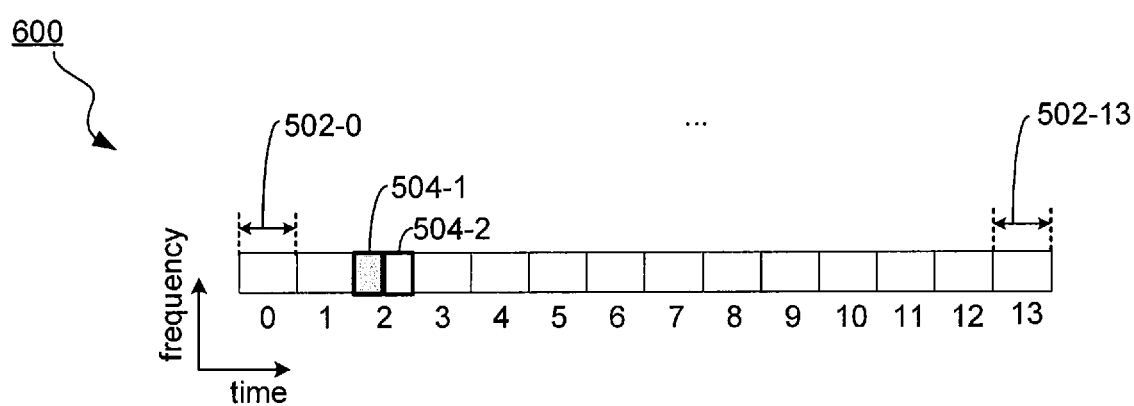
FIG. 6 illustrates a schematics of a radio frame structure with a plurality of sidelink resource unit, in accordance with some embodiments of the present disclosure.

FIG. 6 illustrates a schematics of a radio frame structure 600 with a plurality of sidelink resource unit 504, in accordance with some embodiments of the present disclosure. It should be noted FIG. 6 is for illustration purposes and is not intended to be limiting. A radio frame structure 600 may comprise any numbers of sidelink resource unit 504 at any positions and the sidelink resource unit 504 further comprises any numbers of physical or logical time slots and the time slots may further comprise any numbers of symbols in the time domain at any positions for sidelink communications, which are within the scope of this invention.

In the illustrated embodiment, the radio frame structure 600 comprises 14 physical time slots 502, in which 1 time slot 502 is for sidelink communications. Specifically, time slot 502-2, is for sidelink communications. When a slot_start of 2 and a resource aggregation level P with an absolute value C of ½ are indicated, a first sidelink resource unit 504-1 comprises a first symbol part in the second time slot 502-2, a second sidelink resource unit 504-2 comprises a second symbol part in the second time slot 502-2. In some embodiments, the first symbol part in the second time slot 502-2 comprises symbols for sidelink communication and the second symbol part in the second time slot 502-2 comprises no symbols for sidelink communication. In some embodiments, time slot 502-2 comprises at least one symbol in its first 7 symbols for sidelink communication, wherein the at least one symbol is preconfigured by the system or configured by the BS 102.

In some embodiments, the resource aggregation level can be also indicated by a resource aggregation level field (i.e., P field) in a DCI or a SCI message. In some embodiments, the P-field value can be an index I of the aggregation level P, an absolute value C or a parameter N, wherein C is an integer or a fraction, N is an integer. For example $C=2^N$, wherein N=−2, −1, 0, 1, and 2. In some embodiments, an index value of the aggregation level has a one-to-one or one-to-multiple mapping relationship with the parameter (N) and the absolute value (C).

In some embodiments, the resource aggregation level can be indicated using a resource aggregation level set (i.e., P set) in a radio resource control (RRC) message. In some embodiments, a P-set comprises at least one element, wherein the at least one entry is an aggregation level P in a form of an index I, an absolute value C or a parameter N, wherein C is an integer or a fraction, N is an integer. For example $C=2^N$, wherein N=−2, −1, 0, 1, and 2, corresponding to index 0, 1, 2, 3, and 4. In some embodiments, an index value of the aggregation level has a one-to-one or one-to-multiple mapping relationship with the parameter (N) and the absolute value (C). In some embodiments, a P field in a DCI or SCI message can be used to indicate resource aggregation level or an aggregation level index in the P set so as to determine a resource aggregation level.

In some embodiments, a P set comprises a plurality of aggregation level sets, wherein the plurality of aggregation level sets each comprises a plurality of absolute value C of aggregation levels and a plurality of corresponding indices. Similarly, a P field in a DCI or SCI message can be used to indicate resource aggregation level or an aggregation level index in the P set so as to determine a resource aggregation level.

In some embodiments, an aggregation level can be determined according to a predefined relationship between a first numerology (K2) of a sidelink resource pool or resource set and a reference numerology (K1). In some embodiments, the first numerology K2 and the second numerology K1 are indicated by one of the following: the BS 102, pre-configuration parameters, and definition. In some embodiments, an index of the first numerology is u1 and an index of the second numerology is u2.

In some embodiments, an aggregation enable (i.e., P-flag) corresponding to a resource pool can be indicated by one of the following: the BS 102, pre-configuration parameters, and definition. In some embodiments, different P-flag values can be defined for different resource pools. When the P-flag=0, no resource aggregation is enabled or the absolute value C of the resource aggregation level equals 1; and when the P-flag=1, the resource aggregation is enabled. In some embodiments, when no value is configured for P-flag, no resource aggregation is enabled.

In some embodiments, the resource aggregation is enabled, (i.e., P-flag=1), the absolute value of the aggregation level can be determined by a predefined equation, for example C=K2/K1; C=floor(K2/K1); C=ceil(K2/K1); and $C=2^N$, wherein N=u2−u1. For example, when a first numerology K1=15 kiloHertz (kHz) and u1=0 and a second numerology K2=30 kHz and u2=1, an aggregation level C of 2 can be determined according to the equation C=K2/K1. Similarly, the aggregation level C of 2 can be also determined according to the equation $C=2^N$, wherein N=u2−u1. At this aggregation level, a sidelink resource unit comprises 2 time slots for a sidelink transmission. In some embodiments, the 2 time slots can be two adjacent physical time slots or logical time slots or in a sidelink resource pool.

Figure 7:
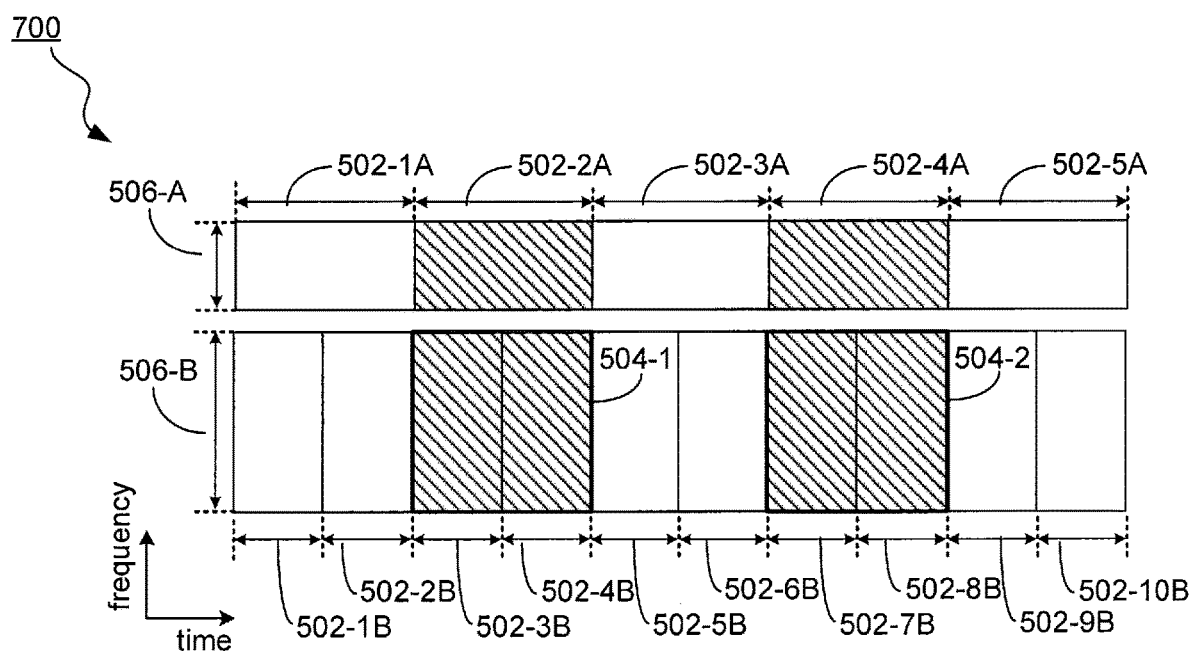
FIG. 7 illustrates a schematics of a radio frame structure with a plurality of sidelink resource unit, in accordance with some embodiments of the present disclosure.

FIG. 7 illustrates a schematics of a radio frame structure 700 with a plurality of sidelink resource unit 504, in accordance with some embodiments of the present disclosure. It should be noted FIG. 7 is for illustration purposes and is not intended to be limiting. A radio frame structure 700 may comprise any numbers of sidelink resource unit 504 at any positions and the sidelink resource unit 504 further comprises any numbers of physical or logical time slots and the time slots may further comprise any numbers of symbols in the time domain at any positions for sidelink communications, which are within the scope of this invention.

In the illustrated embodiment, the radio frame structure 700 comprises 5 physical time slots 502 with a corresponding reference numerology 506-A and 10 physical time slots 502 with a corresponding sidelink numerology 506-B. The reference numerology 506-A is used to indicate sidelink resource pool or resource set. Specifically, time slots 502-2A and 502-4A are for sidelink communications, in which 1 time slot 502 is for sidelink communications. When a resource aggregation level P with an absolute value C of 2 is indicated, time slots 502-3B, 502-4B, 502-7B and 502-8B are for sidelink communications on the resources of the corresponding sidelink numerology 506-B. Further, a first sidelink resource unit 504-1 comprises time slots 502-3B and 502-4B; and a second sidelink resource unit 504-2 comprises time slots 502-7B and 502-8B.

In some embodiments, when a configuration of a sidelink resource unit is determined using one of the methods discussed above, at least one the symbol within a sidelink resource unit can be directly configured by a DCI or a SCI message. In some embodiments, the DCI or the SCI message can indicate a range in the time domain in the sidelink resource unit, wherein symbols in the range in the time domain each can be used as a GAP symbol, a reference signal (RS) symbol, a sidelink synchronization (SS) symbol, and a sidelink communication symbol of a respective sidelink channel. Resource mapping in the range in the time domain can be performed across adjacent time slots without being limited by the time slot boundaries. In some embodiments, the sidelink resource unit comprises 1 GAP symbol.

Figure 8:
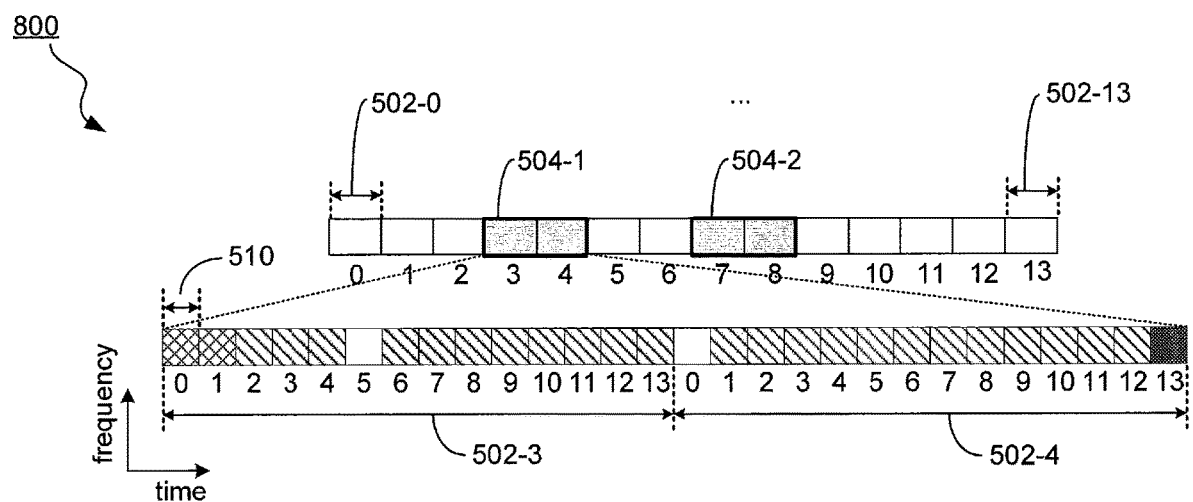
FIG. 8 illustrates a schematics of a radio frame structure with a plurality of sidelink resource unit, in accordance with some embodiments of the present disclosure.

FIG. 8 illustrates a schematics of a radio frame structure 800 with a plurality of sidelink resource unit 504, in accordance with some embodiments of the present disclosure. It should be noted FIG. 8 is for illustration purposes and is not intended to be limiting. A radio frame structure 800 may comprise any numbers of sidelink resource unit 504 at any positions and the sidelink resource unit 504 further comprises any numbers of physical or logical time slots and the time slots may further comprise any numbers of symbols in the time domain at any positions for sidelink communications, which are within the scope of this invention.

In the illustrated embodiment, the radio frame structure 800 comprises 2 sidelink resource units, a first sidelink resource unit 504-1 and a second sidelink resource unit 504-2. Specifically, configurations of the first and second sidelink resource units 504-1 and 504-2 are determined according to a resource aggregation level P and a starting position of the sidelink resource units as discussed above. In the illustrated embodiment, the first sidelink resource unit 504-1 comprises time slots 502-3 and 502-4; and the second sidelink resource unit 504-2 comprises time slots 502-7 and 502-8. The time slots each comprises 14 symbols 510. In the illustrated embodiments, the first sidelink resource unit 504-1 and second sidelink resource unit 504-2 occupies 5 resource blocks (RBs) in the frequency domain. The PSSCH resources occupies symbols that are not used by PSCCH resources, RS symbols, GAP symbols. Specifically, PSCCH resources occupies symbols 0 and 1 in time slot 502-3, RS symbols occupies symbol 5 in time slot 502-3 and symbol 0 in time slot 502-4, and a GAP symbol occupies symbol 13 of time slot 502-4, PSSCH resources occupies symbols 2-4, and 6-13 in time slot 502-3 and symbols 1-12 in time slot 502-4.

Figure 9:
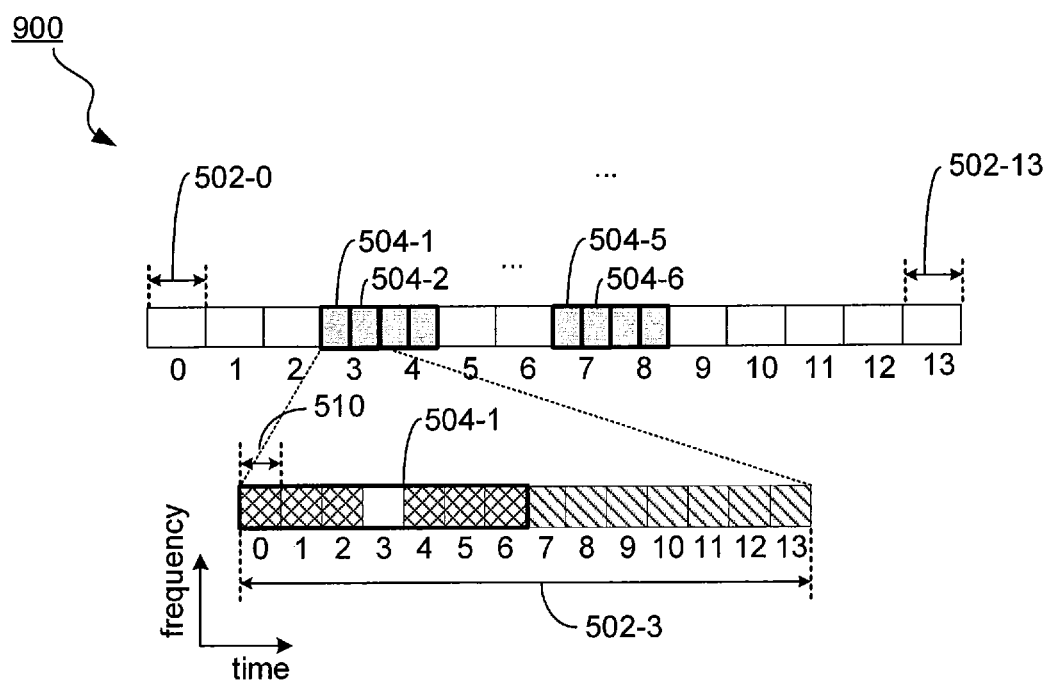
FIG. 9 illustrates a schematics of a radio frame structure with a plurality of sidelink resource unit, in accordance with some embodiments of the present disclosure.

FIG. 9 illustrates a schematics of a radio frame structure 900 with a plurality of sidelink resource unit 504, in accordance with some embodiments of the present disclosure. It should be noted FIG. 9 is for illustration purposes and is not intended to be limiting. A radio frame structure 800 may comprise any numbers of sidelink resource unit 504 at any positions and the sidelink resource unit 504 further comprises any numbers of physical or logical time slots and the time slots may further comprise any numbers of symbols in the time domain at any positions for sidelink communications, which are within the scope of this invention.

In the illustrated embodiment, the radio frame structure 900 comprises 8 sidelink resource units 504. Specifically, configurations of the 8 sidelink resource units 504 are determined according to a resource aggregation level P and a starting position of the sidelink resource units as discussed above. In the illustrated embodiment, a first sidelink resource unit 504-1 comprises ½ time slot 502-3; a second sidelink resource unit 504-2 comprises ½ time slot 502-3; a third sidelink resource unit 504-3 comprises ½ time slot 502-4; a fourth sidelink resource unit 504-4 comprises ½ time slot 502-4; a fifth sidelink resource unit 504-5 comprises ½ time slot 502-7; a sixth sidelink resource unit 504-6 comprises ½ time slot 502-7; a seventh sidelink resource unit 504-7 comprises ½ time slot 502-8; and an eighth sidelink resource unit 504-8 comprises ½ time slot 502-8. Specifically, the 8 sidelink resource units each comprises 7 symbols in the time domain and occupies 3 RBs in the frequency domain. The first sidelink resource unit 504-1 in time slot 502-3 comprises 1 DMRS symbol 510-3 in time slot 502-3 and 6 symbols for PSCCH resources, i.e., symbols 510-0, 510-1, 510-2, 510-4, 510-5, and 510-6.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a first wireless communication device, comprising:
   determining a sidelink resource unit in a sidelink resource set according to a resource aggregation level, wherein the sidelink resource unit in the sidelink resource set comprises a first number of first resource units in the time domain and a second number of second resource units in the frequency domain, and wherein the first number of the first resource units in the time domain is determined according to the resource aggregation level,
   wherein the determining further comprises: determining the resource aggregation level according to at least one of the following: a resource aggregation level value, a preconfiguration of the resource aggregation level, a resource aggregation level table, a resource aggregation level field, and a resource aggregation level set, and a predefined relationship between a first numerology of the sidelink resource set and a reference numerology, and wherein the resource aggregation level table comprises a plurality of resource aggregation indices,
   wherein the plurality of resource aggregation indices each corresponds to a resource aggregation level (C), wherein C is a non-negative number and is one of the following: an integer and a fraction.

2. The method of claim 1, wherein the resource aggregation level is one of the following: a number of symbol parts in one of the first resource units and a first number of the first resource units.

3. The method of claim 1, wherein the resource aggregation level value is indicated by a Radio Resource Control (RRC) message.

4. The method of claim 1, wherein one of the plurality of resource aggregation indices is indicated by one of the following: a RRC message, a downlink control information (DCI) message and a sidelink control information (SCI) message.

5. The method of claim 1, wherein the resource aggregation level field comprises one of the following: a resource aggregation index in the resource aggregation level table, an index in the resource aggregation set, a resource aggregation level value, and a resource aggregation level parameter, and wherein the aggregation level field is in one of the following: a DCI message and a SCI message.

6. The method of claim 1, wherein the resource aggregation level set comprises a plurality of resource aggregation indices, wherein the plurality of resource aggregation indices each corresponds to a resource aggregation level (C), wherein C is a non-negative number and is one of the following: an integer and a fraction.

7. The method of claim 6, wherein one of the plurality of resource aggregation indices is indicated by a RRC message.

8. The method of claim 1, wherein the predefined relationship is one of the following: configured by a wireless communication node, a preconfigured parameter, and definition.

9. A method performed by a wireless communication node, comprising:
   transmitting configuration information of a sidelink resource unit in a sidelink resource set to a first wireless communication device, wherein the configuration information of the sidelink resource unit comprises a resource aggregation level,
   wherein the configuration information is used by the first wireless communication device to determine the sidelink resource unit for sidelink communications, wherein the sidelink resource unit in the sidelink resource set comprises a first number of first resource units in the time domain and a second number of second resource units in the frequency domain, and wherein the first number of the first resource units in the time domain is determined according to the resource aggregation level,
   wherein the determining further comprises: determining the resource aggregation level according to at least one of the following: a resource aggregation level value, a preconfiguration of the resource aggregation level, a resource aggregation level table, a resource aggregation level field, and a resource aggregation level set, and a predefined relationship between a first numerology of the sidelink resource set and a reference numerology, and
   wherein the resource aggregation level table comprises a plurality of resource aggregation indices, wherein the plurality of resource aggregation indices each corresponds to a resource aggregation level (C), wherein C is a non-negative number and is one of the following: an integer and a fraction.

10. The method of claim 9, wherein the resource aggregation level is one of the following: a number of symbol parts in one of the first resource units and a first number of the first resource units.

11. The method of claim 9, wherein the resource aggregation level value is indicated by a Radio Resource Control (RRC) message.

12. The method of claim 9, wherein one of the plurality of resource aggregation indices is indicated by one of the following: a RRC message, a downlink control information (DCI) message and a sidelink control information (SCI) message.

13. The method of claim 9, wherein the resource aggregation level field comprises one of the following: a resource aggregation index in the resource aggregation level table, an index in the resource aggregation set, a resource aggregation level value, and a resource aggregation level parameter, and wherein the aggregation level field is in one of the following: a DCI message and a SCI message.

14. The method of claim 9, wherein the resource aggregation level set comprises a plurality of resource aggregation indices, wherein the plurality of resource aggregation indices each corresponds to a resource aggregation level (C), wherein C is a non-negative number and is one of the following: an integer and a fraction.

15. The method of claim 14, wherein one of the plurality of resource aggregation indices is indicated by a RRC message.

16. The method of claim 9, wherein the predefined relationship is one of the following: configured by the wireless communication node, a preconfigured parameter, and definition.

* * * * *